(12) United States Patent
Wei

(10) Patent No.: US 11,360,343 B2
(45) Date of Patent: Jun. 14, 2022

(54) LIQUID CRYSTAL DISPLAY MODULE

(71) Applicant: WUHAN CHINA STAR OPTOELECTRONICS TECHNOLOGY CO., LTD., Hubei (CN)

(72) Inventor: Qi Wei, Hubei (CN)

(73) Assignee: WUHAN CHINA STAR OPTOELECTRONICS TECHNOLOGY CO., LTD, Hubei (CN)

( * ) Notice: Subject to any disclaimer, the term of this patent is extended or adjusted under 35 U.S.C. 154(b) by 310 days.

(21) Appl. No.: 16/756,130

(22) PCT Filed: Mar. 17, 2020

(86) PCT No.: PCT/CN2020/079569
§ 371 (c)(1),
(2) Date: Apr. 15, 2020

(87) PCT Pub. No.: WO2021/103351
PCT Pub. Date: Jun. 3, 2021

(65) Prior Publication Data
US 2022/0004051 A1    Jan. 6, 2022

(30) Foreign Application Priority Data

Nov. 27, 2019  (CN) .......................... 201911185142.9

(51) Int. Cl.
*G02F 1/1335* (2006.01)
*G06V 40/13* (2022.01)
*G02F 1/1333* (2006.01)

(52) U.S. Cl.
CPC .... *G02F 1/133512* (2013.01); *G02F 1/13338* (2013.01); *G02F 1/133514* (2013.01); *G02F 1/133528* (2013.01); *G02F 1/133548* (2021.01); *G06V 40/1318* (2022.01)

(58) Field of Classification Search
CPC ........... G02F 1/13338; G02F 1/133512; G02F 1/133528; G02F 1/133548; G06V 40/12; G06V 40/13; G06V 40/1318
See application file for complete search history.

(56) References Cited

U.S. PATENT DOCUMENTS

2016/0246417 A1* 8/2016 Liu .................... G02F 1/13338

FOREIGN PATENT DOCUMENTS

| CN | 106773229 A |   | 5/2017  |            |
|----|-------------|---|---------|------------|
| CN | 110208982 A |   | 9/2019  |            |
| CN | 110222620 A | * | 9/2019  | G06K 9/0002 |
| CN | 110286512 A |   | 9/2019  |            |
| CN | 110399797 A |   | 11/2019 |            |
| CN | 110441944 A |   | 11/2019 |            |
| KR | 20160117863 A |   | 10/2016 |            |

* cited by examiner

*Primary Examiner* — Jessica M Merlin
(74) *Attorney, Agent, or Firm* — Soroker Agmon Nordman

(57) ABSTRACT

A liquid crystal display module includes a display panel and a backlight module. The display panel includes a first substrate and a second substrate disposed opposite to each other, a liquid crystal layer, a first polarizer, and a plurality of fingerprint recognition units. The first substrate includes filter parts and light shielding parts. The first polarizer uses a patterned polarizer. The display panel can realize fingerprint identification while displaying. The fingerprint recognition unit is provided with an analyzer unit to avoid crosstalk.

20 Claims, 3 Drawing Sheets

LIQUID CRYSTAL DISPLAY MODULE

This application claims the priority of Chinese Application No. 201911185142.9 filed on Nov. 27, 2019 and titled "liquid crystal display module", which is incorporated herein by reference in its entirety.

FIELD OF INVENTION

The present disclosure relates to the field of display panel technologies, and more particularly to a liquid crystal display module.

BACKGROUND OF INVENTION

With the rapid development of display technologies, display panels with optical fingerprint recognition have been gradually popularized in various high-end mobile phones. Compared with liquid crystal display panels, organic light emitting diode (OLED) display panels have inherent advantages. Taking a small hole imaging scheme as an example, a pixel unit in the OLED display panel can be used as a light emitting source, and emitted light diffusely reflects through a surface of a touched body (finger) and is received by the fingerprint recognition unit, thereby forming a fingerprint image.

However, for the liquid crystal display panel, if it is desired to realize fingerprint recognition based on the principle of small hole imaging, it is necessary to perfect part of the structure of the liquid crystal display panel, otherwise a large part of light received by the fingerprint recognition unit is interference light, which will produce serious crosstalk.

In summary, a new liquid crystal display module needs to be provided to solve the above technical problems.

SUMMARY OF INVENTION

In an embodiment of the present invention provides a liquid crystal display module, which solves technical problems that a current liquid crystal display module easily generates serious crosstalk when implementing fingerprint identification.

To solve the above issues, technical solutions provided by the present invention are as follows:

An embodiment of the present invention provides a liquid crystal display module comprising a display panel and a backlight module disposed at a back of the display panel. The display panel comprises a first substrate comprising a plurality of filter parts disposed at intervals and light shielding parts disposed between at least two adjacent filter parts; a second substrate disposed opposite to the first substrate; a liquid crystal layer disposed between the first substrate and the second substrate; a first polarizer comprising a first area and a second area, wherein the first area corresponds to the filter parts, the second area corresponds to the light shielding parts, a polarization direction of the first area is perpendicular to a polarization direction of the second area, and the first polarizer is a metal wire grid polarizer; and a plurality of fingerprint identification units disposed between the first substrate and the liquid crystal layer. Light emitted by the backlight module passes through the filter parts to diffusely reflect on a surface of a touched body and form reflected light, and at least part of the reflected light passes through the second area and reaches the fingerprint identification units to form a fingerprint image.

In an embodiment of the present invention, the display panel further comprises a plurality of analyzer units, the analyzer unit are disposed between the second area and the fingerprint recognition unit, the analyzer units correspond to the fingerprint identification units in one-to-one correspondence; wherein a polarization direction of the analyzer unit is the same as the polarization direction of the second area.

In an embodiment of the present invention, the analyzer unit is disposed on a side of the first substrate facing the second substrate, and the fingerprint identification unit is disposed on a side of the analyzer unit near the second substrate.

In an embodiment of the present invention, the display panel further comprises a second polarizer, the second polarizer is disposed on a side of the second substrate facing away from the first substrate; wherein a polarization direction of the second polarizer is perpendicular to the polarization direction of the first area.

In an embodiment of the present invention, the analyzer unit is disposed on a side of the first substrate facing the second substrate, and the fingerprint identification unit is disposed on a side of the analyzer unit near the second substrate.

In an embodiment of the present invention, an orthographic projection of the analyzer unit on the first substrate is located within an orthographic projection of the light shielding part on the first substrate.

In an embodiment of the present invention, the light shielding part comprises a black matrix, the black matrix covers the first substrate corresponding to the light shielding part, the black matrix is provided with an opening, and the analyzer unit and the fingerprint recognition unit are located inside the opening.

In an embodiment of the present invention, a sum of thicknesses of the analyzer unit, the fingerprint identification unit, and the liquid crystal layer at a position corresponding to the opening is equal to a thickness of the liquid crystal layer at a position corresponding to the filter part.

In an embodiment of the present invention, the analyzer unit is a metal wire grid polarizer.

In an embodiment of the present invention, the display panel further comprises a cover plate, the cover plate is disposed on the first polarizer, and the touched body touches a side of the cover plate away from the first polarizer.

An embodiment of the present invention further provides a liquid crystal display module comprising a display panel and a backlight module disposed at a back of the display panel. The display panel comprises a first substrate comprising a plurality of filter parts disposed at intervals and light shielding parts disposed between at least two adjacent filter parts; a second substrate disposed opposite to the first substrate; a liquid crystal layer disposed between the first substrate and the second substrate; a first polarizer comprising a first area and a second area, wherein the first area corresponds to the filter parts, the second area corresponds to the light shielding parts, a polarization direction of the first area is perpendicular to a polarization direction of the second area; and a plurality of fingerprint identification units disposed between the first substrate and the liquid crystal layer. Light emitted by the backlight module passes through the filter parts to diffusely reflect on a surface of a touched body and form reflected light, and at least part of the reflected light passes through the second area and reaches the fingerprint identification units to form a fingerprint image.

In an embodiment of the present invention, the display panel further comprises a plurality of analyzer units, the analyzer unit are disposed between the second area and the fingerprint recognition unit, the analyzer units correspond to the fingerprint identification units in one-to-one correspondence; wherein a polarization direction of the analyzer unit is the same as the polarization direction of the second area.

In an embodiment of the present invention, the display panel further comprises a second polarizer, the second polarizer is disposed on a side of the second substrate facing away from the first substrate; wherein a polarization direction of the second polarizer is perpendicular to the polarization direction of the first area.

In an embodiment of the present invention, the analyzer unit is disposed on a side of the first substrate facing the second substrate, and the fingerprint identification unit is disposed on a side of the analyzer unit near the second substrate.

In an embodiment of the present invention, an orthographic projection of the analyzer unit on the first substrate is located within an orthographic projection of the light shielding part on the first substrate.

In an embodiment of the present invention, the light shielding part comprises a black matrix, the black matrix covers the first substrate corresponding to the light shielding part, the black matrix is provided with an opening, and the analyzer unit and the fingerprint recognition unit are located inside the opening.

In an embodiment of the present invention, a sum of thicknesses of the analyzer unit, the fingerprint identification unit, and the liquid crystal layer at a position corresponding to the opening is equal to a thickness of the liquid crystal layer at a position corresponding to the filter part.

In an embodiment of the present invention, the analyzer unit is a metal wire grid polarizer.

In an embodiment of the present invention, an outline of the second area is one of a quadrangle or a circle.

In an embodiment of the present invention, the filter part comprises a pixel unit composed of a red color resist, a green color resist, and a blue color resist.

Beneficial Effect

Beneficial effect of embodiments of the present invention: The liquid crystal display module provided by embodiments of the present invention is formed by diffusely reflecting light emitted from the backlight module through the filter part by the touched body. At least part of the light is recognized and received by the fingerprint recognition unit, and fingerprint recognition can be realized while displaying. In addition, the first polarizer uses a patterned polarizer to separate the light with fingerprint recognition from other interference light. The fingerprint recognition unit is provided with an analyzer unit, so that the fingerprint recognition unit can only receive light with fingerprint identification information. Disturbing light in other directions is absorbed by the analyzer unit and cannot reach the fingerprint recognition unit, thereby avoiding crosstalk.

DESCRIPTION OF DRAWINGS

In order to explain the technical solution in the embodiments or the prior art more clearly, the accompanying drawings used in the description of the embodiments or the prior art will be briefly introduced below. Obviously, the drawings in the following description are only some embodiments of the present invention. For those of ordinary skill in the art, other drawings can be obtained according to the drawings without paying creative efforts.

DETAILED DESCRIPTION OF PREFERRED EMBODIMENTS

Figure 1:
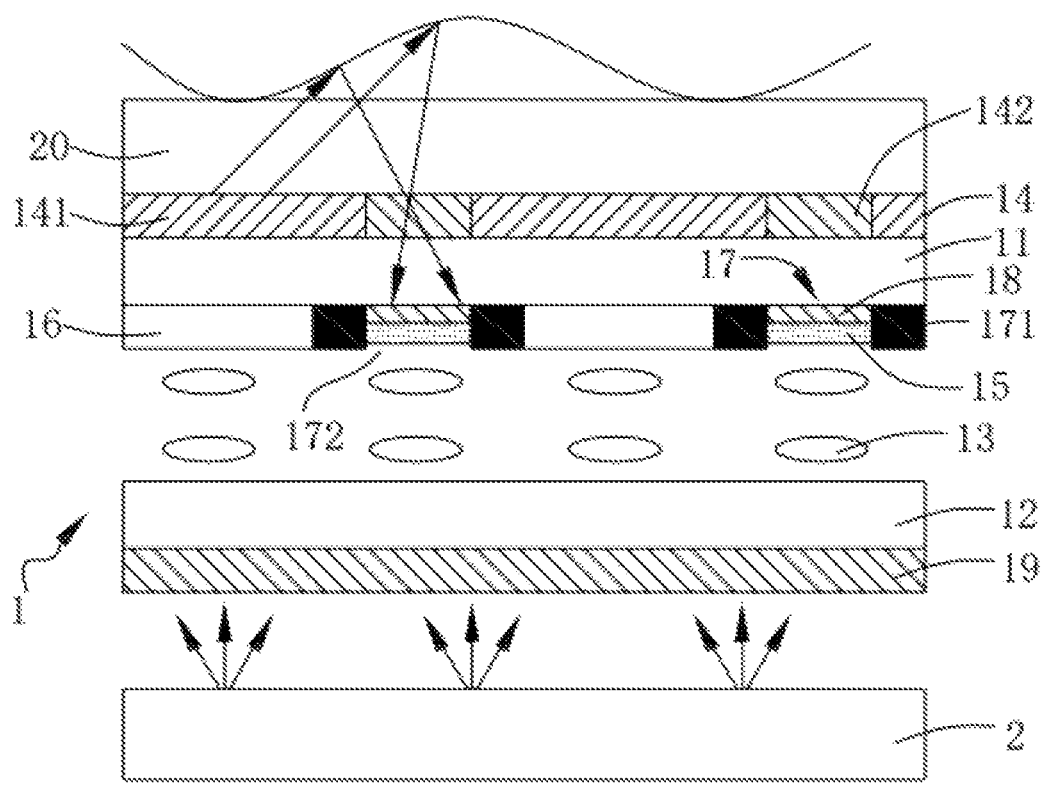
FIG. 1 is a schematic cross sectional diagram of a first liquid crystal display module according to an embodiment of the present invention.

The following descriptions of the embodiments are made with reference to additional illustrations to illustrate specific embodiments in which the present invention can be implemented. The directional terms mentioned in the present invention, such as up, down, front, back, left, right, inside, outside, side, etc., are only directions referring to the accompanying drawings. Therefore, the directional terms used are for explaining and understanding the present invention, but not for limiting the present invention. In the figures, similarly structured units are denoted by the same reference numerals.

For a liquid crystal display module of the prior art, when fingerprint recognition is realized, serious crosstalk is easy to occur, and an embodiment of the present invention can solve the defect.

As shown in FIG. 1, a liquid crystal display module provided by an embodiment of the present invention includes a display panel 1 and a backlight module 2 disposed at a back of the display panel 1. A part of light emitted by the backlight module 2 is used to realize image display, and another part of the light is used as a fingerprint identification light source. The display panel 1 includes a first substrate 11, a second substrate 12, a liquid crystal layer 13, a first polarizer 14, and a plurality of fingerprint recognition units 15. The first substrate 11 and the second substrate 12 are oppositely arranged. The liquid crystal layer 13 is located between the first substrate 11 and the second substrate 12. The fingerprint identification units 15 are disposed between the first substrate 11 and the liquid crystal layer 13 and are configured to receive the reflected light formed by diffuse reflection on a surface of a touched body (such as a finger) and perform fingerprint recognition based on the reflected light.

It should be noted that in an embodiment of the present invention, the first substrate 11 is a color filter substrate, and the second substrate 12 is an array substrate.

Specifically, the first substrate 11 includes a plurality of filter parts 16 disposed at intervals and light shielding parts 17 disposed between at least two adjacent filter parts 16. The filter parts 16 are configured to filter light emitted by the backlight module 2 to form red, yellow, and blue primary colors. The light shielding parts 17 are configured to avoid crosstalk of light. Each of the filter parts 16 includes a color resist unit, which is composed of a red color resist R, a green color resist G, and a blue color resist B. It is understood that, the color resist unit may also be composed of a red color resist R, a green color resist G, a blue color resist B, and a white color resist W, which should not be limited in the embodiments of the present invention.

The first polarizer 14 includes a first area 141 and a second area 142. The first area 141 corresponds to the filter parts 16. The second area 142 corresponds to the light shielding parts 17. A polarization direction of the first area 141 is perpendicular to a polarization direction of the second area 142. Therefore, after light emitted by the backlight module 2 passes through the filter parts 16, diffuse reflection occurs on a surface of a touched body to form reflected light. The reflected light within a certain angular range above the second area 142 at least partially passes through the second area 142 and is received by the fingerprint identification unit 15 as fingerprint identification light to form a fingerprint image. The reflected light outside the angle range passes through the first area 141, which is essentially interference light that easily causes crosstalk to the fingerprint recognition. The fingerprint identification light and the interference light respectively form polarized light after passing through the second area 142 and the first area 141, and the polarization directions of the two are different, thereby separating the fingerprint identification light and the interference light.

Specifically, compared to a conventional polarizer, the first polarizer 14 may use a patterned polarizer. That is, the second area 142 is patterned so that the polarization direction of the first area 141 is perpendicular. The first polarizer 14 may also use a conventional polarizer, and a phase retardation film is provided on the first polarizer 14. The phase retardation film includes a non-delay part and a delay part. The non-delayed part corresponds to the first area 141, and reflected light passes through the first area 141 without phase delay. The delay part corresponds to the second area 142, and phase delay amount of the delay part is ½λ. Phase delay of the reflected light passing through the second area 142 causes a polarization direction of the reflected light after exiting the second area 142 to be perpendicular to a polarization direction of the reflected light before entering the second area 142.

Figure 2:
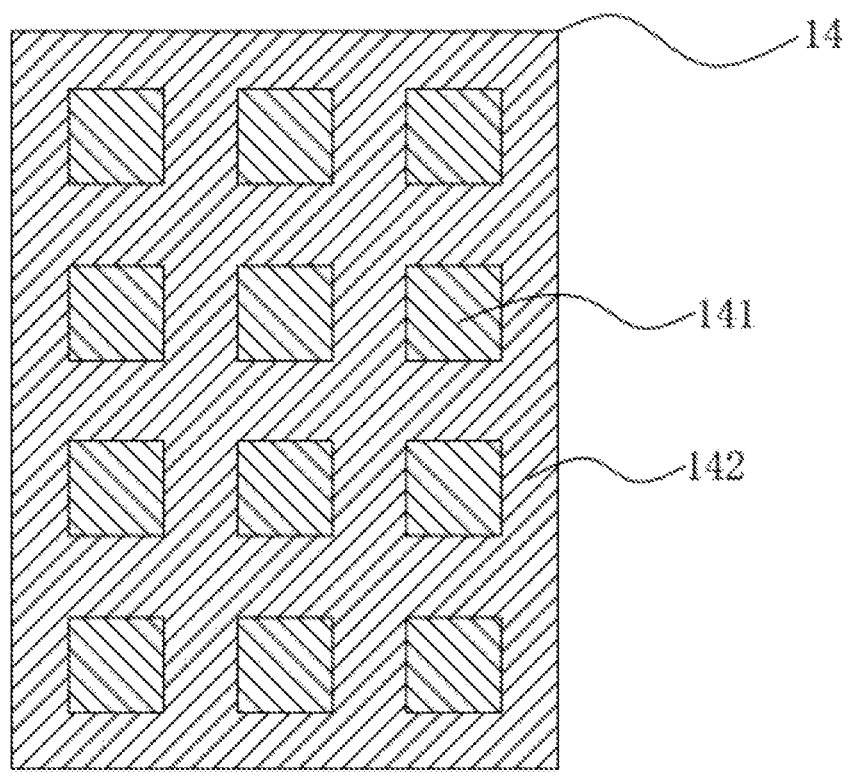
FIG. 2 is a schematic plan view of a first polarizer according to an embodiment of the present invention.

Specifically, as shown in FIG. 2, which is a schematic plan view of the first polarizer 14, an outline of the second area 142 may be one of a quadrangle or a circle.

Referring again to FIG. 1, the display panel 1 further includes a plurality of analyzer units 18. Each of the analyzer units 18 is located between the second area 142 and the fingerprint identification unit 15. The analyzer units 18 correspond to the fingerprint identification units 15 in one-to-one correspondence. Reflected light needs to pass through the analyzer unit 18 before being received by the fingerprint identification unit 15 to check whether the reflected light passing through the analyzer unit 18 is fingerprint identification light. Specifically, a polarization direction of the analyzer unit 18 is the same as the polarization direction of the second area 142. This causes the fingerprint recognition light to pass through the analyzer unit 18 and be received by the fingerprint recognition unit 15.

Further, the polarization direction of the first area 141 is perpendicular to the polarization direction of the analyzer unit 18. Disturbing light passing through the first area 141 is absorbed by the analyzer unit 18 and thus cannot be received by the fingerprint identification unit 15. This avoids crosstalk caused by interference light to the fingerprint recognition light and avoids affecting accuracy of fingerprint recognition. Even the interference light transmitted from the adjacent second area 142 has an excessively large angle and a small energy, and its interference is not strong. In addition, a distance between the two adjacent fingerprint recognition units 15 can be adjusted to improve and avoid influence of the interference light on fingerprint recognition.

The display panel 1 further includes a second polarizer 19. The second polarizer 19 is disposed on a side of the second substrate 12 facing away from the first substrate 11. A polarization direction of the second polarizer 19 and the polarization direction of the first area 141 are perpendicular to each other. Liquid crystal molecules in the liquid crystal layer 13 have optical rotation characteristics for polarized light, when a voltage is applied to the display panel 1, an arrangement direction of the liquid crystal molecules rotates under control of an electric field. Therefore, light emitted by the backlight module 2 passes through the second polarizer 19 and the liquid crystal layer 13 in order, and then exits from the first area 141 of the first polarizer 14, thereby realizing a normal display function.

It can be understood that a propagation order of light emitted by the backlight module 2 is that: the light emitted by the backlight module 2 passes through the second polarizer 19, the second substrate 12, the liquid crystal layer 13, the filter part 16, the first substrate 11, and the first area 141 in sequence. A part of the light is emitted from the display panel 1 to realize a normal display function. Another part of the light is diffusely reflected on the surface of the touched body to form reflected light. After the reflected light passes through the second area 142, the first substrate 11, and the analyzer unit 18 in sequence, the reflected light is received by the fingerprint recognition unit 15 to generate a fingerprint image to realize a fingerprint recognition function.

The analyzer unit 18 is located on a side of the first substrate 11 facing the second substrate 12, and the fingerprint identification unit 15 is located on a side of the analyzer unit 18 near the second substrate 12.

An orthographic projection of the analyzer unit 18 on the first substrate 11 is located in a orthographic projection of the light shielding part 17 on the first substrate 11 to prevent the light emitted by the backlight module 2 from sequentially passing through the filter part 16 and the analyzer unit 18 when propagating upward.

Specifically, the light shielding part 17 includes a black matrix 171. The black matrix 171 covers the first substrate 11 of the light shielding part 17. The black matrix 171 is provided with an opening 172. The analyzer unit 18 and the fingerprint identification unit 15 are located in the opening 172. On one hand, the polarization direction of the analyzer unit 18 and the polarization direction of the second polarizer 19 are the same. Therefore, when the light emitted from the backlight module 2 propagates upward, it is absorbed by the analyzer unit 18. The analyzer unit 18 is the same as the black matrix 171 and can also play a role in shielding light. On another hand, it is possible to save space occupied by the analyzer unit 18 and the fingerprint recognition unit 15 and reduce a thickness of the display panel 1.

Figure 3:
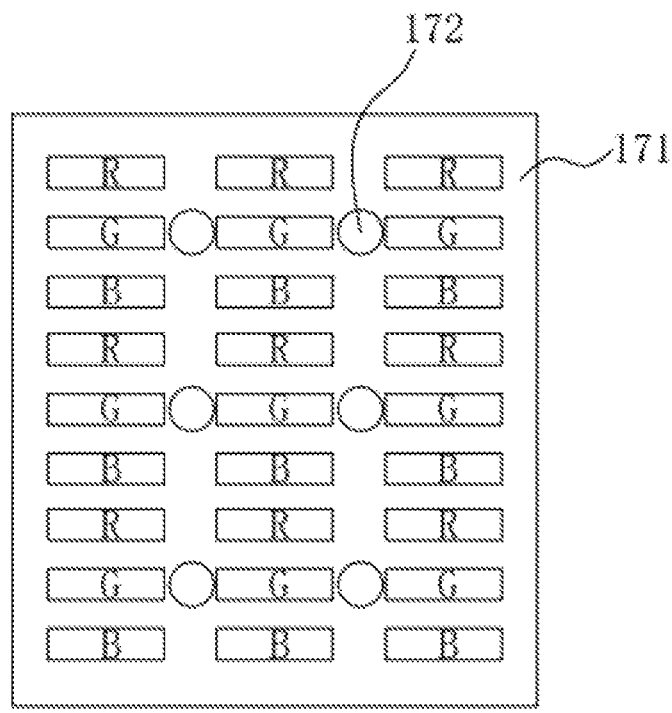
FIG. 3 is a schematic diagram of positions of openings on a black matrix according to an embodiment of the present invention.

FIG. 3 is a schematic diagram of positions of openings 172 on the black matrix 171. In an embodiment of the invention, the openings 172 are arranged in a horizontal and vertical array. A period of the openings 172 may be the same as a period of the color resist unit or may be different from the period of the color resist unit.

Figure 4:
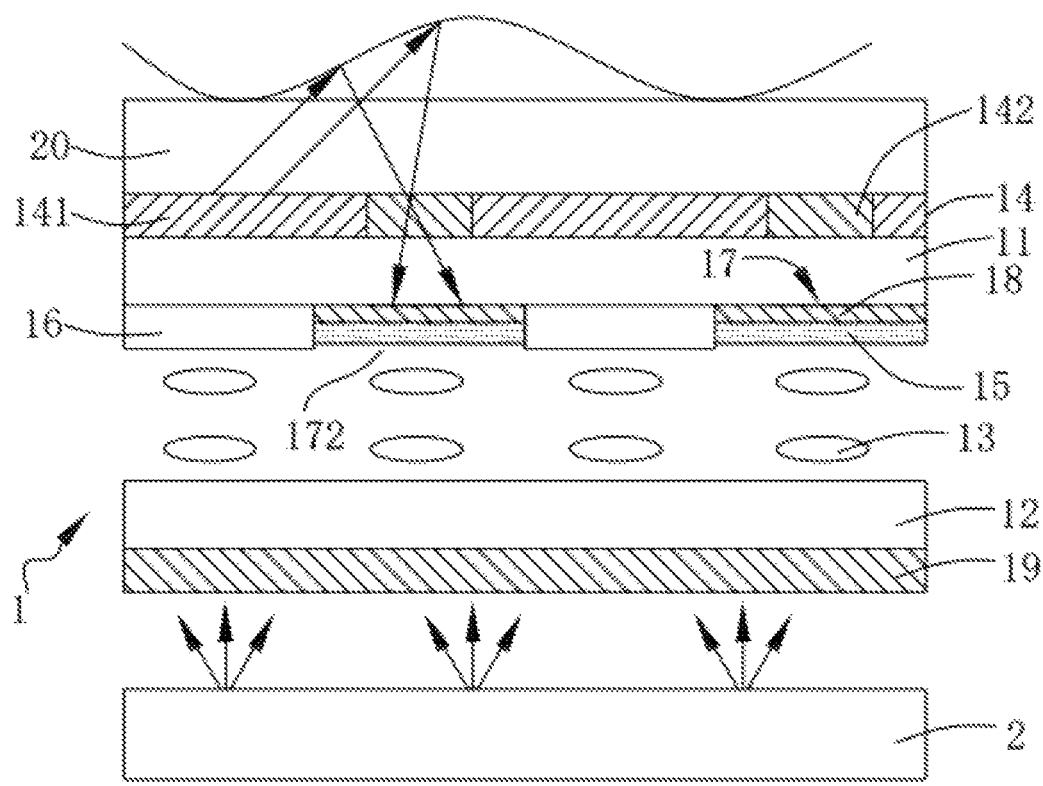
FIG. 4 is a schematic cross sectional diagram of a second liquid crystal display module according to an embodiment of the present invention.

Further, FIG. 4 is a schematic cross sectional diagram of a second liquid crystal display module according to an embodiment of the present invention. Compared with the first type liquid crystal display module shown in FIG. 1, FIG. 4 is different in that: a width of the analyzer unit 18 and a width of the light shielding part 17 are same, so that the black matrix 171 can be eliminated. Because the width of the analyzer unit 18 is larger, a range in which the reflected light enters the analyzer unit 18 is increased. Space for placing the fingerprint recognition unit 15 becomes larger. In addition, it is advantageous to increase a circuit placement space associated with the fingerprint identification unit 15.

Further, a sum of thicknesses of the analyzer unit 18, the fingerprint identification unit 15, and the liquid crystal layer 13 at a position corresponding to the opening 172 is equal to a thickness of the liquid crystal layer 13 at a position corresponding to the filter part 16. This ensures that the first substrate 11 and the second substrate 12 have the same cell thickness at each position.

In an embodiment of the present invention, the analyzer unit 18 is a metal wire grid polarizer. Similarly, the first polarizer 14 and the second polarizer 19 are also metal wire grid polarizers.

The display panel 1 further includes a cover plate 20. The cover plate 20 is located on the first polarizer 14. The cover plate 20 is transparent glass. The touched body touches a side of the cover plate 20 away from the first polarizer 14.

Figure 5:
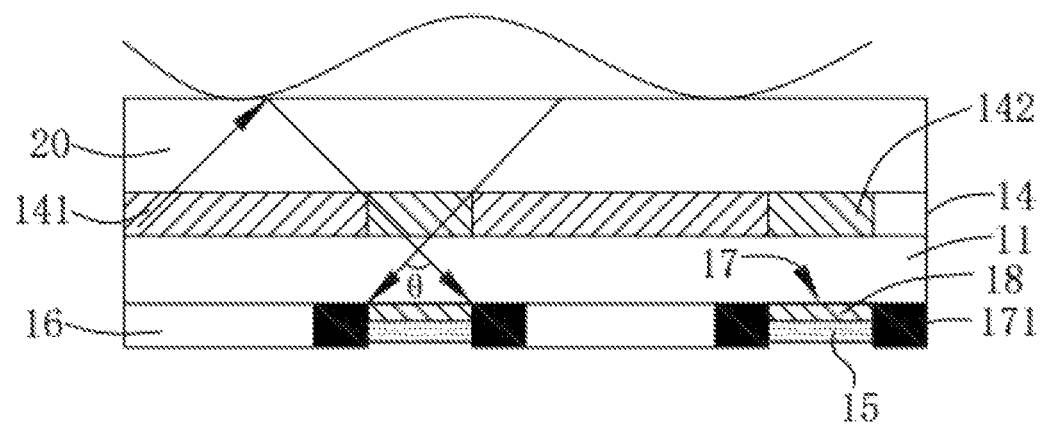
FIG. 5 is a schematic diagram of reflected light propagation according to an embodiment of the present invention.

As shown in FIG. 5, an angle range at which each fingerprint recognition unit 15 can receive reflected light is set to θ, then $\tan(θ/2)=(S1+S2)/H2$. Each of the fingerprint recognition units 15 can cover a width of a touched body area $D=(S1+S2)+2*H1*\tan(θ/2)$. S1 is a width of the second area 142, S2 is a width of the analyzer unit 18, H1 is a thickness of the cover plate 20, and H2 is a thickness of the first substrate 11.

It can be understood that the angle range θ of the reflected light covered by each fingerprint recognition unit 15, the width S1 of the second area 142, the width S2 of the analyzer unit 18, and the thickness H2 of the first substrate 11 are related. The width D of the touched body area covered by each fingerprint recognition unit 15, the width S1 of the second area 142, the width S2 of the analyzer unit 18, the thickness H1 of the cover plate 20, and the thickness H2 of the first substrate 11 are related. Therefore, each fingerprint recognition unit 15 can receive the angle range θ of reflected light and each fingerprint recognition unit 15 can cover the width D of the touched body area, and the above parameters can be adjusted according to actual conditions.

Beneficial effect of embodiments of the present invention: The liquid crystal display module provided by embodiments of the present invention is formed by diffusely reflecting light emitted from the backlight module through the filter part by the touched body. At least part of the light is recognized and received by the fingerprint recognition unit, and fingerprint recognition can be realized while displaying. In addition, the first polarizer uses a patterned polarizer to separate the light with fingerprint recognition from other interference light. The fingerprint recognition unit is provided with an analyzer unit, so that the fingerprint recognition unit can only receive light with fingerprint identification information. Disturbing light in other directions is absorbed by the analyzer unit and cannot reach the fingerprint recognition unit, thereby avoiding crosstalk.

In summary, although the present invention has been disclosed as above with preferred embodiments, the above preferred embodiments are not intended to limit the present invention. Those skilled in the art can make various modifications and retouching without departing from the spirit and scope of the present invention. Therefore, the protection scope of the present invention is subject to the scope defined by the claims.

What is claimed is:

1. A liquid crystal display module, comprising:
    a display panel; and
    a backlight module disposed at a back of the display panel;
    wherein the display panel comprises:
        a first substrate comprising a plurality of filter parts disposed at intervals and light shielding parts disposed between at least two adjacent filter parts;
        a second substrate disposed opposite to the first substrate;
        a liquid crystal layer disposed between the first substrate and the second substrate;
        a first polarizer comprising a first area and a second area, wherein the first area corresponds to the filter parts, the second area corresponds to the light shielding parts, a polarization direction of the first area is perpendicular to a polarization direction of the second area, and the first polarizer is a metal wire grid polarizer; and
        a plurality of fingerprint identification units disposed between the first substrate and the liquid crystal layer;
        wherein light emitted by the backlight module passes through the filter parts to diffusely reflect on a surface of a touched body and form reflected light, and at least part of the reflected light passes through the second area and reaches the fingerprint identification units to form a fingerprint image.

2. The liquid crystal display module according to claim 1, wherein the display panel further comprises a plurality of analyzer units, the analyzer unit are disposed between the second area and the fingerprint recognition unit, the analyzer units correspond to the fingerprint identification units in one-to-one correspondence; wherein a polarization direction of the analyzer unit is the same as the polarization direction of the second area.

3. The liquid crystal display module according to claim 2, wherein the analyzer unit is disposed on a side of the first substrate facing the second substrate, and the fingerprint identification unit is disposed on a side of the analyzer unit near the second substrate.

4. The liquid crystal display module according to claim 2, wherein the display panel further comprises a second polarizer, the second polarizer is disposed on a side of the second substrate facing away from the first substrate; wherein a polarization direction of the second polarizer is perpendicular to the polarization direction of the first area.

5. The liquid crystal display module according to claim 2, wherein the analyzer unit is disposed on a side of the first substrate facing the second substrate, and the fingerprint identification unit is disposed on a side of the analyzer unit near the second substrate.

6. The liquid crystal display module according to claim 5, wherein an orthographic projection of the analyzer unit on the first substrate is located within an orthographic projection of the light shielding part on the first substrate.

7. The liquid crystal display module according to claim 6, wherein the light shielding part comprises a black matrix, the black matrix covers the first substrate corresponding to the light shielding part, the black matrix is provided with an opening, and the analyzer unit and the fingerprint recognition unit are located inside the opening.

8. The liquid crystal display module according to claim 7, wherein a sum of thicknesses of the analyzer unit, the fingerprint identification unit, and the liquid crystal layer at a position corresponding to the opening is equal to a thickness of the liquid crystal layer at a position corresponding to the filter part.

9. The liquid crystal display module according to claim 1, wherein the analyzer unit is a metal wire grid polarizer.

10. The liquid crystal display module according to claim 1, wherein the display panel further comprises a cover plate, the cover plate is disposed on the first polarizer, and the touched body touches a side of the cover plate away from the first polarizer.

11. A liquid crystal display module, comprising:
a display panel; and
a backlight module disposed at a back of the display panel;
wherein the display panel comprises:
a first substrate comprising a plurality of filter parts disposed at intervals and light shielding parts disposed between at least two adjacent filter parts;
a second substrate disposed opposite to the first substrate;
a liquid crystal layer disposed between the first substrate and the second substrate;
a first polarizer comprising a first area and a second area, wherein the first area corresponds to the filter parts, the second area corresponds to the light shielding parts, a polarization direction of the first area is perpendicular to a polarization direction of the second area; and
a plurality of fingerprint identification units disposed between the first substrate and the liquid crystal layer;
wherein light emitted by the backlight module passes through the filter parts to diffusely reflect on a surface of a touched body and form reflected light, and at least part of the reflected light passes through the second area and reaches the fingerprint identification units to form a fingerprint image.

12. The liquid crystal display module according to claim 11, wherein the display panel further comprises a plurality of analyzer units, the analyzer unit are disposed between the second area and the fingerprint recognition unit, the analyzer units correspond to the fingerprint identification units in one-to-one correspondence; wherein a polarization direction of the analyzer unit is the same as the polarization direction of the second area.

13. The liquid crystal display module according to claim 12, wherein the display panel further comprises a second polarizer, the second polarizer is disposed on a side of the second substrate facing away from the first substrate; wherein a polarization direction of the second polarizer is perpendicular to the polarization direction of the first area.

14. The liquid crystal display module according to claim 12, wherein the analyzer unit is disposed on a side of the first substrate facing the second substrate, and the fingerprint identification unit is disposed on a side of the analyzer unit near the second substrate.

15. The liquid crystal display module according to claim 14, wherein an orthographic projection of the analyzer unit on the first substrate is located within an orthographic projection of the light shielding part on the first substrate.

16. The liquid crystal display module according to claim 15, wherein the light shielding part comprises a black matrix, the black matrix covers the first substrate corresponding to the light shielding part, the black matrix is provided with an opening, and the analyzer unit and the fingerprint recognition unit are located inside the opening.

17. The liquid crystal display module according to claim 16, wherein a sum of thicknesses of the analyzer unit, the fingerprint identification unit, and the liquid crystal layer at a position corresponding to the opening is equal to a thickness of the liquid crystal layer at a position corresponding to the filter part.

18. The liquid crystal display module according to claim 11, wherein the analyzer unit is a metal wire grid polarizer.

19. The liquid crystal display module according to claim 11, wherein an outline of the second area is one of a quadrangle or a circle.

20. The liquid crystal display module according to claim 11, wherein the filter part comprises a pixel unit composed of a red color resist, a green color resist, and a blue color resist.

* * * * *